United States Patent
Winblad et al.

(10) Patent No.: US 12,177,341 B2
(45) Date of Patent: Dec. 24, 2024

(54) RADIO TRANSMITTER APPARATUS WITH CRYPTOGRAPHIC ENGINE

(71) Applicant: Nordic Semiconductor ASA, Trondheim (NO)

(72) Inventors: Marko Winblad, Oulu (FI); Hannu Talvitie, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 329 days.

(21) Appl. No.: 17/802,837

(22) PCT Filed: Mar. 9, 2021

(86) PCT No.: PCT/EP2021/055903
§ 371 (c)(1),
(2) Date: Aug. 26, 2022

(87) PCT Pub. No.: WO2021/180714
PCT Pub. Date: Sep. 16, 2021

(65) Prior Publication Data
US 2023/0090750 A1    Mar. 23, 2023

(30) Foreign Application Priority Data

Mar. 9, 2020   (GB) ...................................... 2003404

(51) Int. Cl.
*H04L 9/08* (2006.01)
*G06F 21/75* (2013.01)
*H04L 9/32* (2006.01)

(52) U.S. Cl.
CPC .......... *H04L 9/0861* (2013.01); *G06F 21/755* (2017.08); *H04L 9/3236* (2013.01); *H04L 2209/80* (2013.01)

(58) Field of Classification Search
CPC . H04L 9/0861; H04L 9/3236; H04L 2209/80; G06F 21/755
(Continued)

(56) References Cited

U.S. PATENT DOCUMENTS

2003/0084336 A1    5/2003   Anderson et al.
2010/0124332 A1    5/2010   Arena
(Continued)

FOREIGN PATENT DOCUMENTS

IL           180693 B       11/2011
WO    WO 2013/088121 A1    6/2013
(Continued)

OTHER PUBLICATIONS

Camurati et al., "Screaming Channels: When Electromagnetic Side Channels Meet Radio Transceivers," *Proceedings of the 2018 Acm Sigsac Conference on Computer and Communications Security*, Oct. 2018, 14 pages..
(Continued)

*Primary Examiner* — Zi Ye
(74) *Attorney, Agent, or Firm* — Klarquist Sparkman, LLP (57) ABSTRACT

An integrated-circuit radio transmitter chip comprises a transmitter, a cryptographic engine and control circuitry for the cryptographic engine. The cryptographic engine performs a cryptographic operation by receiving input data, performing a first process to generate first result data and a second process to generate second result data. The first and second result data are used to generate output data. In response to determining that the transmitter is active, the control circuity controls the cryptographic engine to perform the first process and prevents the cryptographic engine from performing the second process while the transmitter is active. The control circuitry controls the cryptographic
(Continued)

engine to perform the second process in response to determining that the transmitter is not active.

20 Claims, 3 Drawing Sheets

(58) Field of Classification Search
USPC .......................................................... 380/270
See application file for complete search history.

(56) References Cited

U.S. PATENT DOCUMENTS

2013/0259226 A1  10/2013  Ciet et al.
2018/0337932 A1* 11/2018  Juster ...................... G06F 21/35

FOREIGN PATENT DOCUMENTS

WO   WO 2019/149731 A1   8/2019
WO   WO 2020/002423 A1   1/2020

OTHER PUBLICATIONS

ISO Search Report under Section 17(5) for GB2003404.7, mailed Aug. 10, 2020, 4 pages.
International Search Report and Written Opinion for PCT/EP2021/055903, mailed May 27, 2021, 16 pages.
Mahanta et al., "Securing RSA against power analysis attacks through non-uniform exponent partitioning with randomization," *The Institution of Engineering and Technology*, Aug. 17, 2017, 9 pages.
Saab et al., "Side-Channel Protections for Cryptographic Instruction Set Extensions," *Cryptology ePrint Archive*, Paper 2016/700, Jul. 2016, 12 pages.

* cited by examiner

RADIO TRANSMITTER APPARATUS WITH CRYPTOGRAPHIC ENGINE

CROSS REFERENCE TO RELATED APPLICATIONS

This is the U.S. National Stage of International Application No. PCT/EP2021/055903, filed Mar. 9, 2021, which was published in English under PCT Article 21 (2), which in turn claims the benefit of Great Britain Application No. 2003404.7, filed Mar. 9, 2020.

BACKGROUND OF THE INVENTION

This invention relates to a radio transmitter apparatus having a cryptographic engine.

It is known to integrate a radio transmitter, a main processor and a cryptographic engine, separate from the main processor, on a single integrated circuit (IC) chip. Such radio-on-a-chip devices can facilitate efficient and secure radio communications by using the crypto engine to encrypt and/or sign data for transmission by the radio transmitter, without burdening the main processor with this task. Such chips may also include a radio receiver and may use the crypto engine for decrypting and/or authenticating incoming radio messages.

The cryptographic engine should seek to keep sensitive data, such as cryptographic keys and unencrypted plaintext messages, protected from attackers.

Some attacks are applied purely on intercepted radio message data—e.g. a brute-force, trial-and-error approach to discover an encryption key. Other attacks, known as side-channel attacks, additionally use measurements that reveal details about the actual cryptographic process carried out by the chip.

Some side-channel attacks involve monitoring the electrical current drawn by a chip as it performs a cryptographic operation. Fluctuations in the current can reveal details about the mathematical calculations the chip is performing as it applies the cryptographic operation to the sensitive data. Statistical analysis on multiple observations of the operation may enable an attacker to discover the sensitive data itself. However, such attacks require the attacker to be in close proximity to the chip.

A side-channel attack that has recently been identified as a possible threat to radio-on-a-chip devices is the "screaming channel" attack. This may potentially be conducted from far away. It is based on the observation that electrical noise in digital logic portions of the chip, such as a processor, may cause unintended amplitude and/or frequency modulation of a radio signal which the chip happens to be transmitting at the same time as the cryptographic operation is being performed. This may happen if digital switching noise couples with a baseband radio signal or with a local oscillator signal, and is then up-converted to radio frequency. This unintended modulation may be amplified and transmitted through a radio antenna.

An attacker could potentially use a radio receiver, located at a distance, to analyse the unintended modulation of the radio signal arising due to the processing of sensitive data with the cryptographic operation. In certain situations, it may be possible for the attacker to discover the sensitive data through an analysis of the unintentional radio modulation. The cryptographic operation need not be related to the intended message content of the radio signal.

Attempts to mitigate side-channel attacks have traditionally used hiding or masking techniques, to make the statistical analysis less feasible. However, these techniques can introduce significant additional complexity, which may be undesirable, and may still not be sufficient to prevent a successful attack.

The present invention seeks to provide a different approach to mitigating the threat of side-channel attacks against an integrated-circuit radio transmitter chip.

SUMMARY OF THE INVENTION

From a first aspect, the invention provides an integrated-circuit radio transmitter chip comprising:
 a radio transmitter;
 a cryptographic engine; and
 control logic for controlling the cryptographic engine,
 wherein the cryptographic engine is configured to perform a cryptographic operation by:
 receiving input data for the cryptographic operation;
 performing a first component process to generate first result data;
 performing a second component process to generate second result data;
 using the first and second result data to generate output data representative of a result of the cryptographic operation; and
 outputting the output data,
 wherein the control logic comprises a radio-state input for receiving a signal indicative of whether the radio transmitter is in an active state for transmitting one or more radio signals, and
 wherein the control logic is configured to use the radio-state input to:
 control the cryptographic engine to perform the first component process in response to determining that the radio transmitter is in the active state, such that the radio transmitter outputs a radio-frequency signal while the cryptographic engine performs the first component process; and
 control the cryptographic engine to perform the second component process in response to determining that the radio transmitter is not in the active state, such that the cryptographic engine performs the second component process while the radio transmitter is not outputting a radio-frequency signal.

From a second aspect, the invention provides an electrical apparatus comprising such an integrated-circuit radio transmitter chip.

Thus it will be seen that, in accordance with the invention, the cryptographic operation is divided into at least two stages, with a first component process being performed while the radio transmitter is active and with the second component process being performed while the radio transmitter is inactive. Importantly, the output data depends on the results of both processes, so even if one of the component processes were compromised by an attacker, the attacker will not be able to discover the full information about the whole cryptographic operation.

This approach can simultaneously protect against local side-channel attacks and against remote side-channel attacks. The threat from a remote side-channel attack, in which an attacker analyses the transmitted radio signal, is mitigated by performing the second component process when the radio transmitter is not active, since the radio transmitter will not amplify and broadcast any side-channel information about this process to the attacker. The threat from a local side-channel attack, in which an attacker directly monitors the power consumption of the chip, is mitigated by performing the first component process when the radio transmitter is active. The additional electrical current drawn by the radio transmitter, and associated local electromagnetic emissions, when the transmitter is active will make it much harder for an attacker to obtain useful information about the operations being performed by the cryptographic engine during the second component process. In particular, the power consumption signals from the radio transmitter will typically be much larger than those of the crypto engine, resulting a very low signal-to-noise ratio for any potential side-channel leakage from the crypto engine.

The control logic may be configured to prevent the cryptographic engine from performing the second component process while the radio transmitter is in the active state. This may be beneficial for ensuring the second component process is not performed while the radio transmitter is transmitting a radio signal, e.g., if the chip comprises a component or mechanism, separate from the control logic, such as a processor, that might otherwise be able to cause the cryptographic engine to perform the second component process at an inappropriate time.

The cryptographic operation may be any of: an encryption operation, a decryption operation, a signature operation, a signature verification operation, a hash operation, a message authentication code (MAC) operation, or any other cryptographic operation. It may be a standardised operation such as AES, SNOW 3G, RSA, etc. The operation may use key data, such as a symmetric key or an asymmetric key. The input data may comprise one or more of: key data, plaintext data, ciphertext data, signature data, hash data or MAC data.

The first component process may be performed before the second component process, or the second component process may be performed before the first component process. The order may be fixed, or the control logic may be configured to determine the order in which to perform the first and second component processes depending on whether the radio transmitter is in the active state at a predetermined point within the cryptographic operation, such as at the start of the cryptographic operation. This may lead to more efficient performance of the cryptographic operation, by only waiting for one change of transmission state, rather than two, during the cryptographic operation.

The control logic may be configured, if the radio transmitter is not in the active state, to wait until the radio transmitter is in the active state, before performing the first component process. It may be configured to determine the state of the transmitter repeatedly during this waiting, e.g. at regular intervals. The control logic may be configured, if the radio transmitter is in the active state, to wait until the radio transmitter is not in the active state, before performing the second component process. It may be configured to determine the state of the transmitter repeatedly during this waiting, e.g. at regular intervals.

The first and second component processes may together comprise all the steps carried out by the cryptographic engine on the input data to generate the output data. However, in some embodiments, the cryptographic operations may comprise one or more further component processes, which may be performed before, after or between the first and second processes. The performance of each further component process may be contingent on the state of the radio transmitter, or it may be performed independent of whether the radio transmitter is in the active state. One of the first and second result data may be the output data, although this is not essential.

The first and second component processes may be distinguished by the processing steps they perform and/or by what data they act on. In particular, they may perform different respective sets of one or more steps from an ordered sequence of steps that form part of the cryptographic operation. Alternatively or additionally, the first and second component processes may act on different respective portions of the input data.

The processes may be sequential. In some embodiments, the first result data may be used by the second component process to generate the second result data. Alternatively, if the second process is performed before the first process, the second result data may be used by the first component process to generate the first result data. The second result data may depend on the first result data, or vice versa.

The cryptographic operation may be an operation that comprises a plurality of identical rounds (such as the rounds in an AES encryption operation). In this case, the first process may comprise performing a first set of one or more of the rounds, and the second process may comprise performing a second set of one or more of the rounds, wherein the first and second sets are non-overlapping sets.

In some embodiments, the first result data depends on a first portion of the input data but does not depend on a second portion of the input data. Similarly, the second result data may depend on the second portion of the input data but not depend on the first portion of the input data. The first and second portions could be respective portions of a cryptographic key, or they could be respective portions of non-key data such as plaintext data, ciphertext data or signature data.

The cryptographic operation may be an operation that is performed on a plurality of blocks of input data of predetermined size (such as a 128-bit AES encryption operation, which acts on 128-bit plaintext blocks). In this case, the first process may comprise performing a cryptographic algorithm—which may be a standardised algorithm, such as an AES encryption—on a first set of one or more blocks of input data, and the second process may comprise performing the cryptographic algorithm on a second set of one or more blocks of the input data, where the first and second sets are non-overlapping sets.

The cryptographic operation may use a block mode of operation (such as cipher block chaining, CBC) in which one of the first and second result data depends on the other of the first and second result data. This can further mitigate the threat posed by an attacker who manages to compromise one of the component processes.

The output data need not necessarily be output all at once, but may be output incrementally over time. Similarly, the input data may be received by the cryptographic engine incrementally over time.

The integrated-circuit chip may be a silicon chip. It may comprise a radio receiver. The chip may comprise an on-chip antenna for transmitting radio signals directly from the chip, or it may comprise a pin for connecting the chip to an off-chip antenna, optionally via an off-chip power amplifier. In this case, the radio transmitter on the chip may output an electrical radio-frequency signal. The chip may comprise one or more processors. It may comprise volatile and non-volatile memory. It may be a system-on-chip (SoC).

The cryptographic engine may comprise a software engine (e.g. cryptographic firmware), stored in a memory of the chip, for execution by a processor of the chip. It may be executed by a main processor (i.e. a processor which also executes other software) or a dedicated cryptographic processor. The cryptographic engine may comprise the cryptographic processor. It may comprise a memory for storing software instructions for the crypto processor; this memory may be inaccessible to a main processor of the chip.

However, in some embodiments, the cryptographic engine is a hardware engine. The cryptographic engine may comprise electronic circuitry, e.g. registers and logic gates, configured for performing the first and second component processes.

Similarly, the control logic engine may comprise software logic, stored in a memory of the chip, for execution by a processor of the chip. This may be a main processor or a dedicated cryptographic processor. The control logic may comprise a cryptographic processor. The control logic may be a component of the cryptographic engine. The radio-state input may be determined using an output register of the radio transmitter, readable by the processor over a bus system of the chip.

However, in some embodiments, the control logic is a hardware state machine. The control logic may comprise electronic circuitry, e.g. registers and logic gates, configured to control the cryptographic engine.

The chip may comprise a processor and a bus for transferring data to and from the processor. The control logic may be coupled to the bus for receiving control signals from the processor. The control logic may receive signals indicative of whether the radio transmitter is in an active state over the bus. However, in some embodiments, the radio-state input may be coupled to the radio transmitter by a connection that is separate from the bus. This may provide greater security against malicious software executing on the processor, which might otherwise be able to trick the control logic into believe the radio transmitter is active when it is not. The separate connection may comprise a dedicate line between the radio transmitter and the control logic, or it may be established over a peripheral interconnect system, or over an inter-processor communication system (e.g. if the radio transmitter and control logic comprise respective processors).

The radio transmitter may be configured to be in the active state when, and only when, the radio transmitter is outputting a radio-frequency (RF) signal. However, in some embodiments, the radio transmitter may signal an active state when it is preparing to output an RF signal, or shortly after it has stopped outputting an RF signal. If so, there is preferably a predetermined maximum time period during which the radio transmitter can be in the active state but not actively transmitting. This allows the control logic to implement a corresponding delay to ensure that the radio is transmitting while the cryptographic engine performs the first component process and is not transmitting while the cryptographic engine performs the second component process.

The control logic may be configured to initiate the first component process within a predetermined time of determining that the radio transmitter is in the active state, or of detecting a change of state of the radio transmitter to the active state. The control logic may be configured to initiate the second component process within a predetermined time of determining that the radio transmitter is not in the active state, or of detecting a change of state of the radio transmitter out of the active state.

In some embodiments, the radio transmitter may start and/or stop transmitting at times that are unpredictable to the control logic. The control logic may, under such circumstances, pause the processing of the first process if the transmission state stops being active until the state is active again. Similarly, it may pause the processing of the second process if the transmission state becomes active, until the state is not active again. However, this is not essential, and it is important to recognise that the identity of the first and second component processes, as disclosed herein, are not necessarily predetermined, but may be defined by the behaviour of the radio transmitter—i.e. so long as the control logic can control the crypto engine to perform some part of the cryptographic operation in response to determining that the radio transmitter is in the active state, this part may be regarded as the first component process; and so long as the control logic can control the crypto engine to perform some further part of the cryptographic operation in response to determining that the radio transmitter is not in the active state, this further part may be regarded as the second component process.

The control logic may be configured to vary, between successive cryptographic operations, how much of the cryptographic operation is performed in the first component process. The control logic may be configured to vary, between successive cryptographic operations, how much of the cryptographic operation is performed in the second component process. The control logic may be configured to vary these amounts in dependence on a pseudo-random value. The chip may comprise a pseudo-random number generator for generating pseudo-random values. Unpredictably varying how much of the operation is performed with the radio transmitter active can provide further protection against statistical cryptanalytic attacks which require an attacker to observe multiple repetitions of the same processes, by varying how much the attacker can observe each time.

The apparatus may comprise a power supply for the chip, such as a battery. The chip may comprise a power management unit for supplying electrical power to the radio transmitter and to the cryptographic engine. Powering the radio transmitter and cryptographic engine from a common power rail on the chip can help prevent a local attacker from being able to observe the power consumption of the cryptographic engine separately from that of the radio transmitter.

The control logic may be configured, under some conditions, to perform a cryptographic operation entirely while the radio transmitter is in the active state, or entirely while the radio transmitter is not in the active state. In particular, the control logic may be configured to do this if a timeout period elapses without the radio transmitter changing to or from the active state. This may ensure that the cryptographic operation can be completed, even if the radio transmitter is prevented from turning on or off—e.g. by an attacker jamming the radio to keep it always on.

The electrical apparatus comprising the integrated-circuit radio transmitter chip may be a computer, a domestic appliance, a vehicle, a wireless sensor, or any other suitable apparatus. It may comprise an antenna. It may comprise a power amplifier, arranged to receive an RF signal from the chip, for radio transmission from the antenna.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
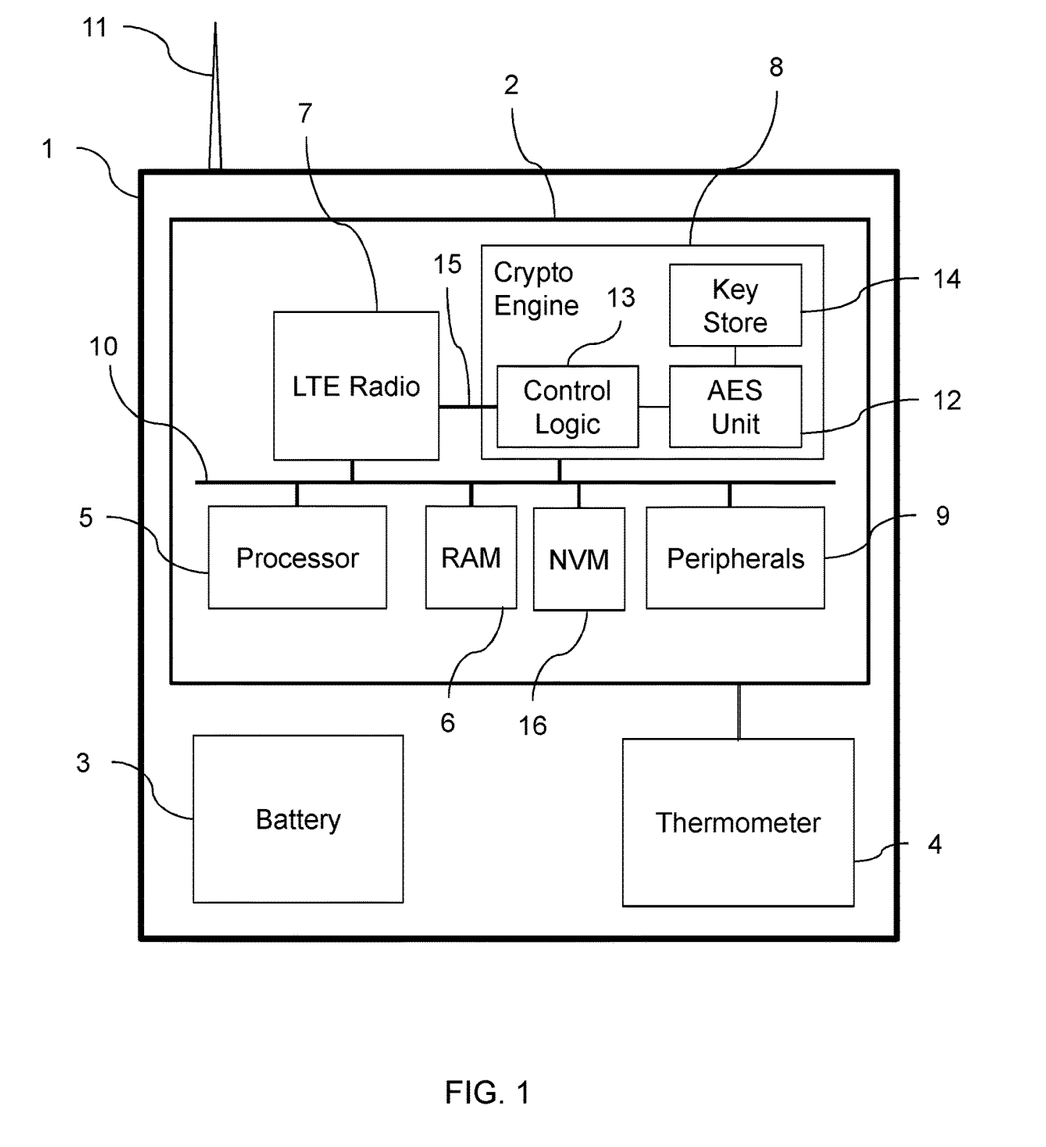
FIG. 1 is a schematic diagram of a wireless temperature sensor including a radio chip embodying the invention.

FIG. 1 shows a wireless temperature sensor 1 which contains an integrated-circuit radio chip 2 embodying the invention, as well as a battery 3 and a thermometer 4. It will be appreciated that the sensor 1 may also contain other components, such as PCBs, quartz oscillators, capacitors, resistors, a housing, user interface features, etc. which are not shown in FIG. 1 for the sake of clarity.

The radio chip 2 integrates a processor 5, random-access memory 6, non-volatile memory (NVM) 16, an LTE Cat-M1 (LTE-M) radio 7, a cryptography engine 8, and various peripherals 9, such as timers, a USB interface, a digital-to-analog converter, etc. These elements are all connected to a system bus 10.

The LTE radio 7 includes transmitter circuitry and receiver circuitry for transmitting and receiving LTE-M data packets. It may include a local oscillator, low-noise amplifier, mixer, power amplifier, filters, modulation and demodulation logic, and other appropriate modules. The radio 7 may include only application-specific digital logic, or it may include one or more processors for executing radio firmware stored in a memory region of the radio 7. A radio antenna 11 is connected to the radio 7 via appropriate off-chip components (not shown).

The crypto engine 8 includes an AES unit 12, for performing Advanced Encryption Standard (AES) encryption and decryption operations, as well as control logic 13 for controlling the operation of the AES unit 12, and a secure key store 14 for storing private encryption keys. The crypto engine 8 may include other units for performing other cipher operations, in addition to the AES unit 12, such as hash operations, signature operations, message authentication code operations, asymmetric ciphers, etc. The AES unit 12 may be implemented at least partly in software executing on a processor within the crypto engine 8. However, in this example, the AES unit 12 is implemented purely in hardware—i.e. using application-specific digital logic. Similarly, the control logic 13 could be implemented at least partly in software executing on a processor within the crypto engine 8. However, in this example, the control logic 13 is purely hardware—i.e. a finite state machine implemented with application-specific digital logic.

The control logic 13 is connected by a communication channel 15 to the LTE radio 7, for receiving information about the transmission state of the LTE radio 7. This channel 15 could be implemented over the system bus 10—e.g. if the LTE radio 7 is a bus master for the bus 10 and uses the bus 10 to write to a register interface of the control logic 13. However, in the present example, the channel 15 comprises a physical link, separate from the system 10. It could comprise one or more dedicated wires, or it may be a channel within a more complex peripheral-to-peripheral interconnect system, such as a Programmable Peripheral Interconnect as described in WO 2013/088121 or WO 2020/002423, by Nordic Semiconductor. In embodiments where the LTE radio 7 and crypto engine 8 both include respective processors, for executing software instructions, the channel 15 may be provided by an inter-processor communication (IPC) link, e.g. as described in WO 2019/149731 by Nordic Semiconductor.

The radio 7 may switch to an active state exactly as it starts transmitting a radio signal, or, in some embodiments, a predetermined period before it starts transmitting (e.g. as it is waking up in preparation for a transmission). In some embodiments, the radio 7 may remain in the active state during brief pauses between successive transmissions, or it may switch to an inactive, non-transmitting state during any intervals. The radio 7 leaves the active state (i.e. switches to an inactive state) once a transmission session is ended; this may correspond to a low-power sleep state of the radio 7. It may switch to the inactive state exactly as it finishes transmitting a radio signal, or, in some embodiments, a predetermined period after it stops transmitting.

The NVM 16 stores software which is executed by the processor 5 for controlling the operation of the wireless temperature sensor 1. In use, the processor 5 uses an I/O peripheral 9 to fetch temperature readings from the thermometer 4 at intervals, and stores these in the NVM 16. The wireless temperature sensor 1 periodically uses the LTE-M radio 7 to transmit a log of temperature information to a network base station (not shown), from where it may be relayed to a destination such as a server on the Internet. Before transmitting log data by radio, the processor 5 instructs the crypto engine 8 to encrypt the log data using AES, to protect user confidentiality.

Figure 2:
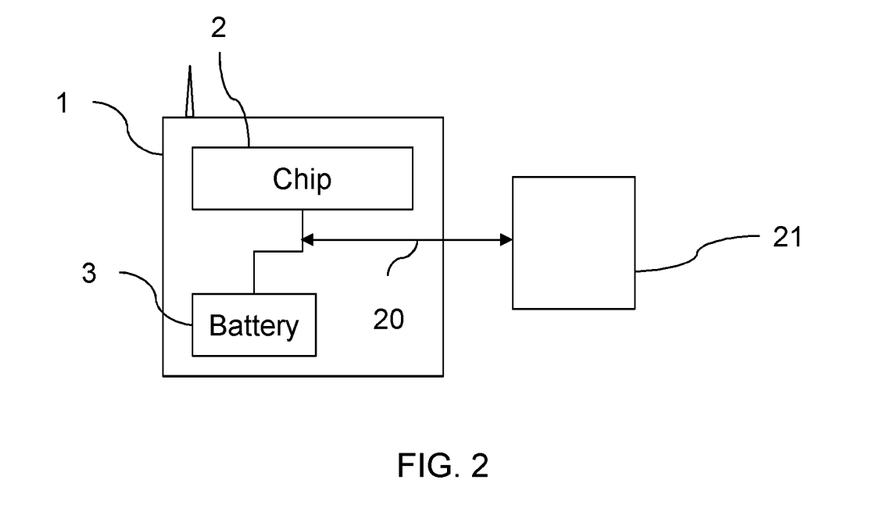
FIG. 2 is a schematic diagram of the wireless temperature sensor being subjected to a local side-channel attack.

FIG. 2 shows the sensor 1 being subjected to a local side-channel attack. An attacker has physically connected a probe 20 between an external computer 21 and a power line between the battery 3 and the microchip 2 of the sensor 1. The computer 21 uses the probe 20 to monitor the current drawing by the chip 2. By analysing fluctuations in the current, e.g. occurring at frequencies corresponding to switching frequencies within the AES unit 12, the attacker may use the computer 21 to apply statistical cryptanalysis techniques to try to discover the private AES key and/or confidential input data that are being processed by the AES unit 12. In some attacks, a closely coupled electromagnetic (EM) field sensor may be used, instead of the electrical probe 20; this may be used to detect current fluctuations without requiring physical contact; however, it still needs to be in close proximity of the sensor 1. By using approaches disclosed herein, the threat from such local attacks is significantly reduced.

Figure 3:
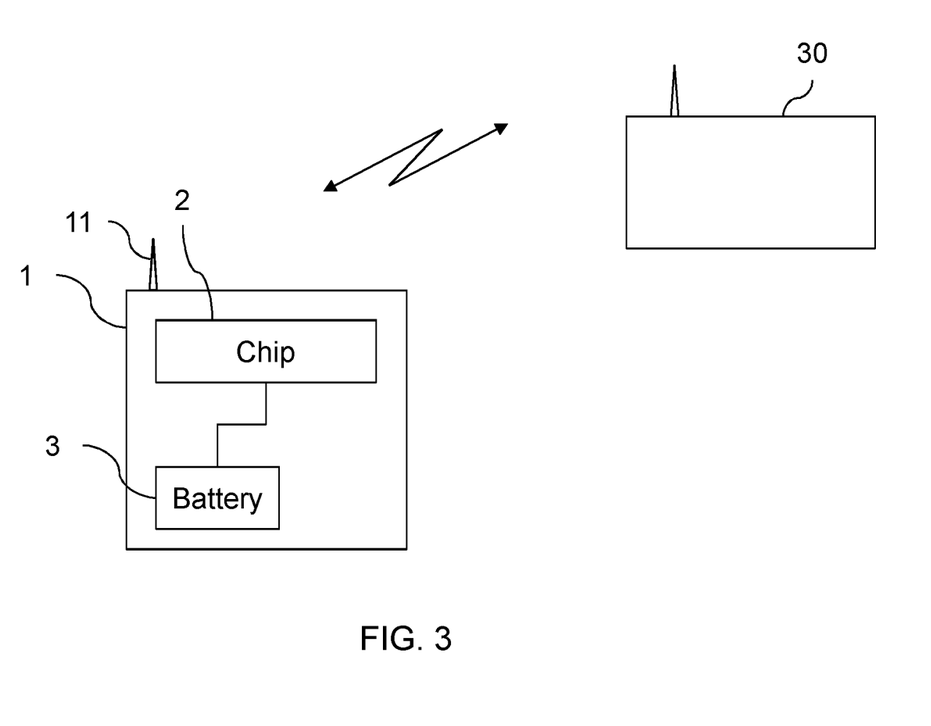
FIG. 3 is a schematic diagram of the wireless temperature sensor being subjected to a remote side-channel attack.

FIG. 3 shows the sensor 1 being subjected to a remote side-channel attack. An attacker uses a radio scanning system 30 to analyse radio emissions emanating from the antenna 11 of the sensor 1. The scanning system 30 may be located far from the sensor 1—e.g. tens, hundreds or even thousands of metres away. The scanning system 30 detects unintentional amplitude modulation of a radio carrier wave transmitted by the radio 2 which may reveal information about operations taking place within the AES unit 12, due to unintended coupling of switching frequencies in the AES unit 12 to the analog transmission path. The attacker may use a computer to apply statistical cryptanalysis techniques to try to discover the private AES key and/or confidential input data that are being processed by the AES unit 12. By using approaches disclosed herein, the threat from such remote attacks is significantly reduced.

Figure 4:
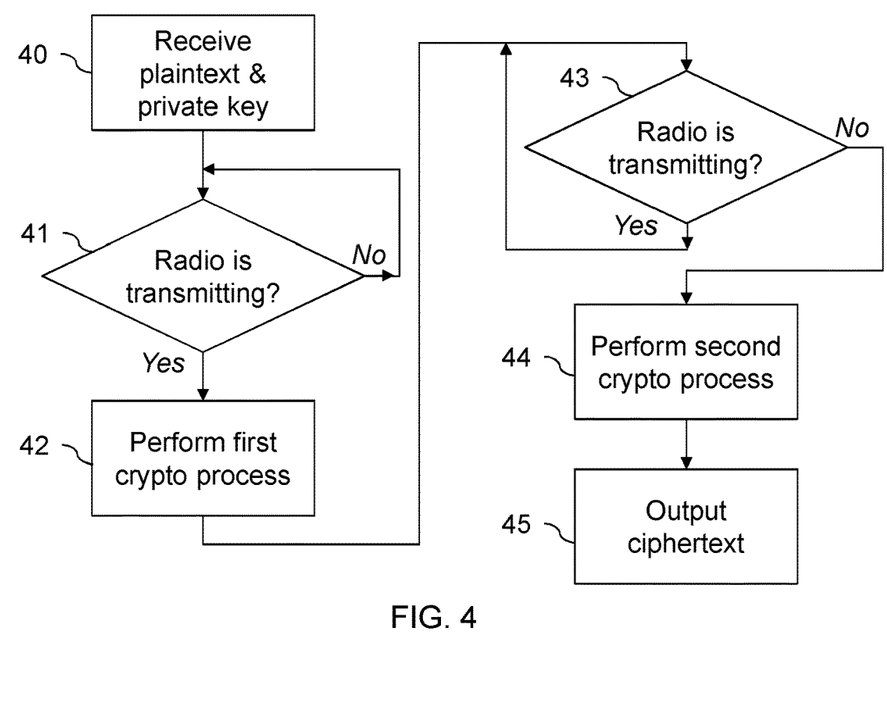
FIG. 4 is a flow chart of steps performed by a cryptography engine of the radio chip.

FIG. 4 outlines the main steps performed by the crypto engine 8 during an AES encryption operation in order to reduce the threat from side-channel attacks, both local attacks and remote attacks. The same principles may be applies to other operations, such as AES decryption, other symmetric-key operations, asymmetric-key cryptographic operations, etc.

In a first step 40, the control logic 13 causes the AES unit 12 to receive a private AES key (e.g. by instructing the key store 14 to load the key to a key register of the AES unit 12) and to start receiving plaintext data for encryption (e.g. from the RAM 6 or NVM 16, over the main bus 10, using direct memory access, DMA).

The control logic 13 then uses the communication channel 15 from the LTE radio 7 to determine 41 if the radio 7 is in the active state. If the radio is not in the active state, the control logic 13 enters a loop in which it continues to check at intervals—e.g. every millisecond. The control logic 13 prevents the AES unit 12 from processing the AES key or plaintext data during this phase.

When the radio is determined to be transmitting, the control logic 13 instructs the AES unit 12 to start performing 42 the AES encryption. If the radio 7 signals the active state a short time period before it actually starts transmitting (e.g. a warm-up period), the control logic 13 may implement a delay before instructing the AES unit 12, to ensure the radio 7 is actively transmitting before the encryption operation commences.

Significantly, the AES unit 12 only performs a portion of the full encryption operation—i.e. a first component process within the operation. This first component process may be specified in different ways, depending on use requirements. The AES unit 12 may, for instance, perform only a fraction of a single block operation—e.g. performing only the first n rounds of the ten rounds of a 128-bit AES block operation, for n<10. Alternatively, where many blocks of plaintext data are to be encrypted, the AES unit 12 may encrypt only the first n % of the blocks, for n<100. The control logic 13 prevents the AES unit 12 from completing the encryption operation until instructed.

The control logic 13 then again uses the communication channel 15 to determine 43 if the radio 7 is still actively transmitting. While the radio continues transmitting, the control logic 13 enters a loop in which it continues to check at intervals—e.g. every millisecond. It prevents the AES unit 12 from continuing the AES operation during this phase.

When the radio is determined to have stopped transmitting, the control logic 13 instructs the AES unit 12 to continue performing 44 the AES encryption—i.e. to perform a second component process within the full AES operation. The AES unit 12 may, for instance, perform the remaining rounds of the single block encryption, or may continue encrypting the remaining plaintext blocks.

Once the full encryption operation is complete, the ciphertext is output 45.

Of course, the receiving of plaintext data may be on-going throughout the operation, and not only occur at the beginning. Similarly, the outputting of ciphertext may be on-going and not only at the end.

By performing a first stage of the AES encryption when the radio transmitter is active, any current signal detected by a probe 20 as shown in FIG. 2 will be dominated by the current drawn by the amplifiers and other components within the LTE radio 7. This can mask any signal leakage from the AES unit 12, making it much harder to perform a successful local cryptanalytic attack on this first portion of the encryption operation, and hence harder to attack the encryption operation as a whole.

By performing a second stage of the AES encryption when the radio transmitter is inactive, no side-channel emissions from the AES unit 12 during this second stage can be amplified and transmitted from the antenna 11 as a radio signal. A remote attacker, operating a radio scanning system 30 as shown in FIG. 3, will therefore not be able to determine any information about this second portion of the encryption operation, making it much harder or impossible to perform a successful remote cryptanalytic attack on the encryption operation as a whole.

When the first and second component processes are distinguished by processing different blocks of plaintext data, the protection provided by this approach may be strengthened by using a block mode of operation that links the respective block operations of the two processes more closely together—e.g. Cipher Block Chaining (CBC), Propagating Cipher Block Chaining (PCBC), Cipher Feedback (CFB), Output Feedback (OFB) or Counter (CTR) mode. This can help to ensure that, even if an attacker discovers information about one component process of the operation, this is unlikely to help in attacking the other component process.

In some embodiments, the amount of processing carried out in the first component cryptographic process (in step 42) may be varied between successive cryptographic operations. The second component process (in step 44) may be adjusted correspondingly. For instance, in one AES encryption operation, the first component process may perform the first five rounds of a 256-bit AES block encryption operation, with the second process performing the remaining nine rounds, while in the next AES encryption operation, the first process may perform the first eight rounds of a 256-bit AES block encryption operation, with the second process performing the remaining six rounds. The control logic 13 may use a pseudo-random number generator to determine a random split between the first and second component processes which can vary between successive operations.

Many side-channel attacks rely on an attacker monitoring many instances of the same operation—e.g. an encryption of the same plaintext data with the same key, albeit with different random initialisation vectors each time. By varying the percentage of the full operation that an attacker (local or remote) might potentially be able to observe, such statistical attacks may be much less likely to succeed in a realistic time frame.

Further randomness may be introduced by the control logic 13 not necessarily starting the first process 42 or second process 44 immediately upon detecting that the radio 7 is in the appropriate transmission state, but after a random time delay (optionally having a guaranteed minimum value). This may make the masking of local emissions from the AES unit 12, when the radio 7 is transmitting, more effective by avoiding there being a predictable temporal connection between the actions of the AES unit 12 and the actions of the radio transmitter 7.

Figure 5:
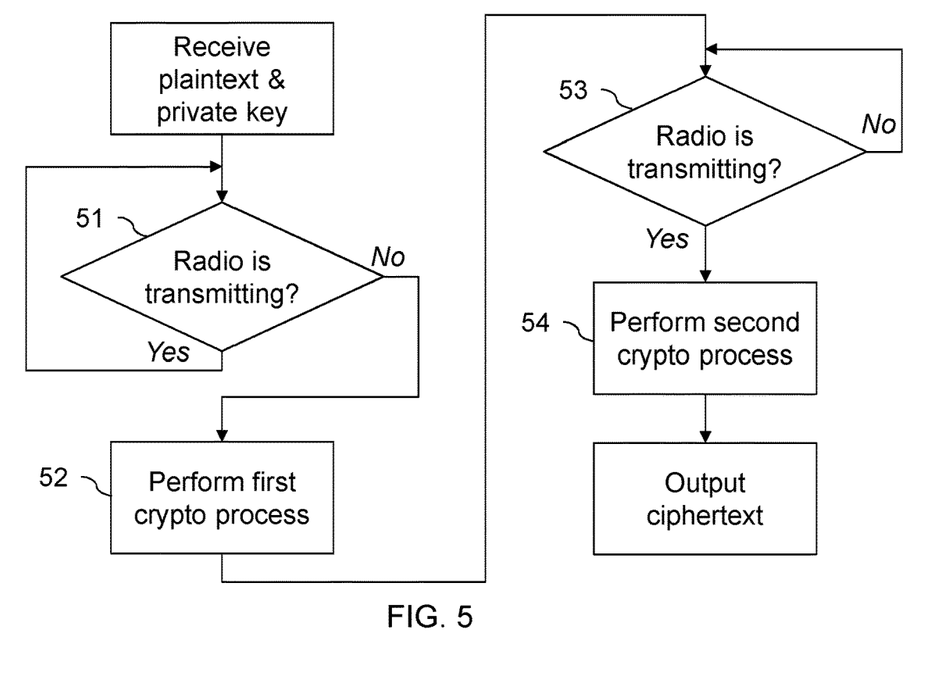
FIG. 5 is a flow chart of steps performed by a cryptography engine of a variant radio chip.

The order in which the component processes may be performed may be reversed. FIG. 5 shows a variant that is very similar to the flow in FIG. 4, but in which the control logic 13 first waits 51 until the radio 7 is not transmitting before starting the first cryptographic process 52, and then waits 53 until the radio 7 is actively transmitting 53 before continuing with the second cryptographic process 54 to complete the entire cryptographic operation.

The cryptographic operation may be divided into more than two stages, with the transition from each stage to the next occurring only after a change of transmission state by the radio 7. However, in some situations, this may delay the successful completion of the operation by an unacceptable amount, so having just two stages may then be preferable.

The control logic 7 may continue to monitor the transmission state of the radio 7 while the AES unit 12 is working and may, in some embodiments, suspend the first or second component process if it detects that the transmission state of the radio 7 changes part-way through one of the processes. It may then instruct the AES unit 12 to continue the suspended process on detecting a reversion of the transmission state of the radio 7.

In some embodiments, it may be important that a cryptographic operation completes within a reasonable time period, even if the transmission state of the radio 7 does not change. The control logic 7 may therefore use a timer to implement a timeout period while waiting to detect a change of transmission state. Upon timing out, the control logic 7 could signal a failure, or it could instruct the AES unit 12 to complete the operation. The latter approach may reduce the security, but it may be a necessary compromise from a user experience perspective, to prevent the sensor 1 being blocked from performing cryptographic operations indefinitely if there is a fault in the radio 7 or if an attacker takes control of the radio 7.

The crypto engine 8 may additionally employ hiding or masking techniques, in combination with these approaches, to provide even greater protection against side-channel attacks.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit radio transmitter chip comprising:
   a radio transmitter;
   a cryptographic engine; and
   control circuitry for controlling the cryptographic engine,
   wherein the cryptographic engine is configured to perform a cryptographic operation by:
   receiving input data for the cryptographic operation;
   performing a first component process to generate first result data;
   performing a second component process to generate second result data; and
   using the first result data and the second result data to generate output data representative of a result of the cryptographic operation; and
   outputting the output data,
   wherein the control circuitry comprises a radio-state input for determining whether the radio transmitter circuit is in an active state in which the radio transmitter circuit transmits one or more radio signals, and
   wherein the control circuitry is configured to use the radio-state input to:
   control the cryptographic engine to perform the first component process in response to determining that the radio transmitter circuit is in the active state, so that the radio transmitter circuit transmits a radio signal while the cryptographic engine performs the first component process;
   prevent the cryptographic engine from performing the second component process while the radio transmitter circuit is in the active state, such that the radio transmitter circuit does not transmit any radio signal while the cryptographic engine performs the second component process; and
   control the cryptographic engine to perform the second component process in response to determining that the radio transmitter circuit is not in the active state.

2. The integrated-circuit radio transmitter chip of claim 1, wherein the control logic is configured to prevent the cryptographic engine from performing the second component process while the radio transmitter is in the active state.

3. The integrated-circuit radio transmitter chip of claim 1, wherein the cryptographic operation is any of an encryption operation, a decryption operation, a signature operation, a signature verification operation, a hash operation, or a message authentication code operation.

4. The integrated-circuit radio transmitter chip of claim 1, wherein the input data comprises one or more of key data, plaintext data, ciphertext data, signature data, hash data or message-authentication-code data.

5. The integrated-circuit radio transmitter chip of claim 1, wherein the control logic is configured to control the cryptographic engine to perform the second component process before the first component process.

6. The integrated-circuit radio transmitter chip of claim 1, wherein the control logic is configured to control the cryptographic engine to perform the first component process and the second component process in an order that depends on whether the radio transmitter is in the active state at a predetermined point within the cryptographic operation.

7. The integrated-circuit radio transmitter chip of claim 1, wherein the control logic is configured, if the radio transmitter is not in the active state, to cause the cryptographic engine to wait until the radio transmitter is in the active state, before performing the first component process.

8. The integrated-circuit radio transmitter chip of claim 1, wherein the control logic is configured, if the radio transmitter is in the active state, to cause the cryptographic engine to wait until the radio transmitter is not in the active state, before performing the second component process.

9. The integrated-circuit radio transmitter chip of claim 1, wherein the first and second component processes together comprise all steps carried out by the cryptographic engine for generating the output data from the input data.

10. The integrated-circuit radio transmitter chip of claim 1, wherein the second component process uses the first result data when determining the second result data, or wherein the first component process uses the second result data when determining the first result data.

11. The integrated-circuit radio transmitter chip of claim 1, wherein the cryptographic operation comprises a plurality of identical rounds, and wherein the first process comprises performing a first set of one or more of the rounds, and the second process comprises performing a second set of one or more of the rounds, wherein the first set and the second set are non-overlapping sets.

12. The integrated-circuit radio transmitter chip of claim 1, wherein the first result data depends on a first portion of the input data but does not depend on a second portion of the input data, and wherein the second result data depends on the second portion of the input data but does not depend on the first portion of the input data.

13. The integrated-circuit radio transmitter chip of claim 1, wherein:
   the cryptographic engine is configured to perform the cryptographic operation on a plurality of blocks of input data, each block having a predetermined size;
   the first process comprises performing a cryptographic algorithm on a first set of one or more blocks of input data;
   the second process comprises performing the cryptographic algorithm on a second set of one or more blocks of the input data; and
   the first set and the second set are non-overlapping sets.

14. The integrated-circuit radio transmitter chip of claim 1, wherein the cryptographic engine is a hardware engine comprising electronic circuitry configured for performing the first component process and the second component process.

15. The integrated-circuit radio transmitter chip of claim 1, further comprising a processor and a bus for transferring data to and from the processor, wherein the radio-state input is coupled to the radio transmitter by a connection that is separate from the bus.

16. The integrated-circuit radio transmitter chip of claim 1, wherein the control logic is configured to initiate the first component process within a predetermined time of determining that the radio transmitter is in the active state, or of detecting a change of state of the radio transmitter to the active state.

17. The integrated-circuit radio transmitter chip of claim 1, wherein the control logic is configured to initiate the second component process within a predetermined time of determining that the radio transmitter is not in the active state, or of detecting a change of state of the radio transmitter out of the active state.

18. The integrated-circuit radio transmitter chip of claim 1, further comprising a pseudo-random number generator for generating pseudo-random values, and wherein the control logic is configured to vary, between successive cryptographic operations by the cryptographic engine, how much of the cryptographic operation is performed in the first component process, or how much of the cryptographic operation is performed in the second component process, in dependence on a pseudo-random value generated by the pseudo-random number generator.

19. The integrated-circuit radio transmitter chip of claim 1, further comprising a power management unit for supplying electrical power to the radio transmitter and to the cryptographic engine.

20. An electrical apparatus comprising the integrated-circuit radio transmitter chip of claim 1, and further comprising a power supply for providing electrical power to the integrated-circuit radio transmitter chip.

\* \* \* \* \*